United States Patent
Kapur et al.

(10) Patent No.: US 10,217,073 B2
(45) Date of Patent: Feb. 26, 2019

(54) MONITORING TRANSACTIONS FROM DISTRIBUTED APPLICATIONS AND USING SELECTIVE METRICS

(71) Applicant: ORACLE INTERNATIONAL CORPORATION, Redwood Shores, CA (US)

(72) Inventors: Kunal Kapur, San Carlos, CA (US); Chi Cheong C. Chan, Daly City, CA (US); Constantinos Papadopoulos, Nicosia (CY); Qiwen Jiang, Shanghai (CN); Qian Li, Shanghai (CN)

(73) Assignee: Oracle International Corporation, Redwood Shores, CA (US)

( * ) Notice: Subject to any disclaimer, the term of this patent is extended or adjusted under 35 U.S.C. 154(b) by 960 days.

(21) Appl. No.: 14/337,874

(22) Filed: Jul. 22, 2014

(65) Prior Publication Data
US 2016/0026950 A1   Jan. 28, 2016

(51) Int. Cl.
*G06Q 10/06* (2012.01)
*H04L 12/26* (2006.01)

(52) U.S. Cl.
CPC ..... *G06Q 10/0639* (2013.01); *H04L 43/0823* (2013.01)

(58) Field of Classification Search
CPC ............. G06Q 10/0639; G06F 11/3466; G06F 11/3495; G06F 2201/87; H04L 43/0823
See application file for complete search history.

(56) References Cited

U.S. PATENT DOCUMENTS

| | | | | |
|---|---|---|---|---|
| 5,946,375 | A * | 8/1999 | Pattison | G07C 1/10 379/111 |
| 6,249,579 | B1 * | 6/2001 | Bushnell | H04M 1/274583 379/356.01 |
| 6,438,594 | B1 * | 8/2002 | Bowman-Amuah | G06F 9/4428 709/203 |
| 7,653,722 | B1 * | 1/2010 | Krishna | G06F 17/30902 709/224 |

(Continued)

OTHER PUBLICATIONS

Kuehnhausen, Martin and Frost, Victor, 2010, Framework for Analyzing SOAP Messages in Web Service Environments, The University of Kansas, pp. 1-11.*

(Continued)

*Primary Examiner* — Matthew S Gart
*Assistant Examiner* — Stephen S Swartz
(74) *Attorney, Agent, or Firm* — Tarolli, Sundheim, Covell & Tummino LLP

(57) ABSTRACT

Systems, methods, and other embodiments associated with monitoring business transactions are described. In one embodiment, a computer-implemented method comprises tracking calls made from a first component to other components in a distributed application wherein the calls are part of processing a business transaction. Aggregate metrics are collected and instance metrics are collected for each of the calls made and a time spent for processing the calls. The method identifies and selects N calls that consumed the most time based on the time spent for processing each call. The instance metrics for the selected N calls and the aggregate metrics are reported to a monitoring server, while the instance metrics from unselected calls are discarded.

22 Claims, 5 Drawing Sheets

(56) References Cited

U.S. PATENT DOCUMENTS

| | | | | |
|---|---|---|---|---|
| 8,046,751 | B1* | 10/2011 | Avadhanula | G06F 8/75 717/104 |
| 8,625,757 | B1* | 1/2014 | Karpov | 379/112.03 |
| 8,910,124 | B1* | 12/2014 | Bhansali | G06F 11/3466 717/127 |
| 8,914,406 | B1* | 12/2014 | Haugsnes | H04L 67/1097 382/305 |
| 2003/0036917 | A1* | 2/2003 | Hite | G06F 9/548 706/48 |
| 2003/0065986 | A1* | 4/2003 | Fraenkel | G06F 11/3006 714/47.2 |
| 2006/0233121 | A1* | 10/2006 | Cooper | G06Q 10/04 370/261 |
| 2008/0019500 | A1* | 1/2008 | Torres | H04M 3/5237 379/265.02 |
| 2009/0113400 | A1* | 4/2009 | Pelleg | G06F 11/3466 717/130 |
| 2010/0070266 | A1* | 3/2010 | McNeill | H04M 3/2281 704/201 |
| 2010/0246800 | A1* | 9/2010 | Geppert | G06F 3/04817 379/265.09 |
| 2011/0153840 | A1* | 6/2011 | Narayana | H04L 67/1029 709/227 |
| 2012/0099714 | A1* | 4/2012 | Hodge | H04M 3/2281 379/88.16 |
| 2012/0311307 | A1* | 12/2012 | Chynoweth | G06F 9/30054 712/234 |
| 2013/0086022 | A1* | 4/2013 | Black, III | G11B 27/36 707/705 |
| 2014/0055880 | A1* | 2/2014 | Jhatakia | G11B 27/36 360/31 |
| 2016/0034380 | A1* | 2/2016 | Shani | G06F 11/3636 717/172 |
| 2016/0249354 | A1* | 8/2016 | Crosby | G06F 9/4881 |

OTHER PUBLICATIONS

2010, Profiling method and apparatus for software applications, JP5648584 B2 (English Translation Description), Japan Invention Patent.*

Oracle Corporation, Business Transaction Management, An Oracle White Paper, May 2010; pp. 1-10, Oracle Corporation, Redwood Shores, CA, USA.

Oracle Corporation, Managing Exceptions in Distributed Applications, An Oracle White Paper, Mar. 2010; pp. 1-10, Oracle Corporation, Redwood Shores, CA USA.

* cited by examiner

| Call # | Root | Caller | Callee Child | Count | Total Time (ms) | Include Top N Call Details? | Notes |
|---|---|---|---|---|---|---|---|
| 1 | Servlet1 | | | | 3500 | Y | Servlet1 to report Top N calls because the total time is within min and max threshold |
| 2 | | Servlet1 | EJB1 | 1 | 2820 | | EJB1 is the only child included in the top N details of Servlet1. The total time of EJB1 is more than 80% of all children calls of Servlet1. |
| 3 | | EJB1 | EJB2 | 2 | 2690 | Y | |
| 4 | | EJB2 | DB1 | 10 | 100 | N | EJB2 does not report Top N calls because the total time taken by EJB2 is less than min threshold |
| 5 | | | DB2 | 14 | 140 | N | |
| 6 | | | EJB3 | 1 | 150 | N | |
| 7 | | EJB3 | DB2 | 40 | 100 | Y | EJB3 reports Top N calls because no min threshold is defined |
| 8 | | EJB2 | DB1 | 10 | 400 | Y | |
| 9 | | | DB2 | 14 | 1700 | Y | During the series of calls to DB2 from EJB2, it timed out. By the time it timed out at 2000ms total execution time for EJB2, only 10 out of 14 DB2 invocations were done. The Top N/X% is reported by EJB2 based on the previously executed calls (10 from DB1 and 10 from DB2). |
| 10 | | | EJB3 | 1 | 200 | | The flow continues, and when EJB2 is done, it reports an updated summary and top N details are reported among all calls (10 + 14 + 1) from all 3 call branches. |
| 11 | | EJB3 | DB2 | 1 | 200 | Y | EJB3 reports Top N calls because no min threshold is defined. |
| 12 | | servlet1 | EJB2 | 1 | 270 | N | |
| 13 | | EJB2 | EJB3 | 1 | 260 | N | EJB2 not to report Top N calls because the execution time does not exceed the min threshold |
| 14 | | EJB3 | DB2 | 37 | 250 | Y | EJB3 reports Top N calls because no min threshold is defined. |
| 15 | | servlet1 | RMI1 | 3 | 130 | N | |

FIG. 4

MONITORING TRANSACTIONS FROM DISTRIBUTED APPLICATIONS AND USING SELECTIVE METRICS

BACKGROUND

Complex distributed systems and applications include software running on multiple servers and may include integrated products or software libraries from multiple vendors. Components of the system are located on networked computers that interact and coordinate their actions to work properly. The system may also interact with third party systems to complete certain transactions.

For example, consider an online shopping application where a customer selects items to purchase and initiates a "submit order" action to buy the items. To the customer, the process appears simple but behind the scenes, the process can be very complex. Many function calls may be made to third party systems and/or calls to different types of systems with multiple technologies. There may be a function call to a credit card system to verify the customer's credit card and available funds, a call to an inventory database to verify that the purchased items are in stock, a call to a shipping system to get shipping information for delivering the purchased items, and other calls needed to process the order. All of the actions performed to complete the "submit order" are referred to as a business transaction. The individual systems and the online shopping application need to work together to properly process the business transaction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 4 illustrates an example table showing details of calls associated with the call-graph of FIG. 3.

DETAILED DESCRIPTION

Systems and methods are described herein that provide monitoring of business transactions in distributed applications by using a combination of aggregate metrics and specific top instance metrics from call details. In one embodiment, the system is configured to capture aggregate metrics of a transaction, and use a novel approach to discriminately capture a subset of instance metrics for slow calls and/or calls that had an error. Unlike prior approaches, the present system and method provides improved efficiency, and reduces or eliminates concerning gaps in detailed instance metrics that are collected. The collected metrics may then be used for diagnostic purposes and improve the analysis of the processes involved during the execution of business transactions by providing an appropriate amount of collected data.

As one example to explain a difference between 'aggregate' and 'instance' metrics, suppose Component A calls Component B 1000 times. This interaction can be represented by a single aggregate metric but also by 1000 instance metrics. The aggregate metric contains, for example, 'aggregate' timing information, such as the average response time of all 1000 calls, the maximum and minimum response times. The instance metric on the other hand, contains for example a greater level of detail for each call such as the response time for each particular invocation. Of course, other details may be collected specific to each call.

In one embodiment, both aggregate and instance metrics may contain the identities of components A and B. However, the instance metric may also contain additional information about a particular invocation, such as the message content for the message sent from component A to B. Both types of metrics are useful and offer different insight. However, instance metrics should be collected with caution; otherwise their large volume of data may overwhelm the monitoring system.

Monitoring business transaction performance for large complex distributed applications frequently requires capturing large amounts of metrics to provide visibility into the business transaction's flow, sequence of calls, and timing information. However, the metrics should be collected efficiently with low overhead on the monitored application. In prior techniques, the amount of data collected was either too little to be useful or too much, which caused prohibitively expensive overhead, and made it harder to store and analyze the collected monitoring data. Besides the overhead, collecting too much data also makes it difficult to make sense of the information.

Figure 1:
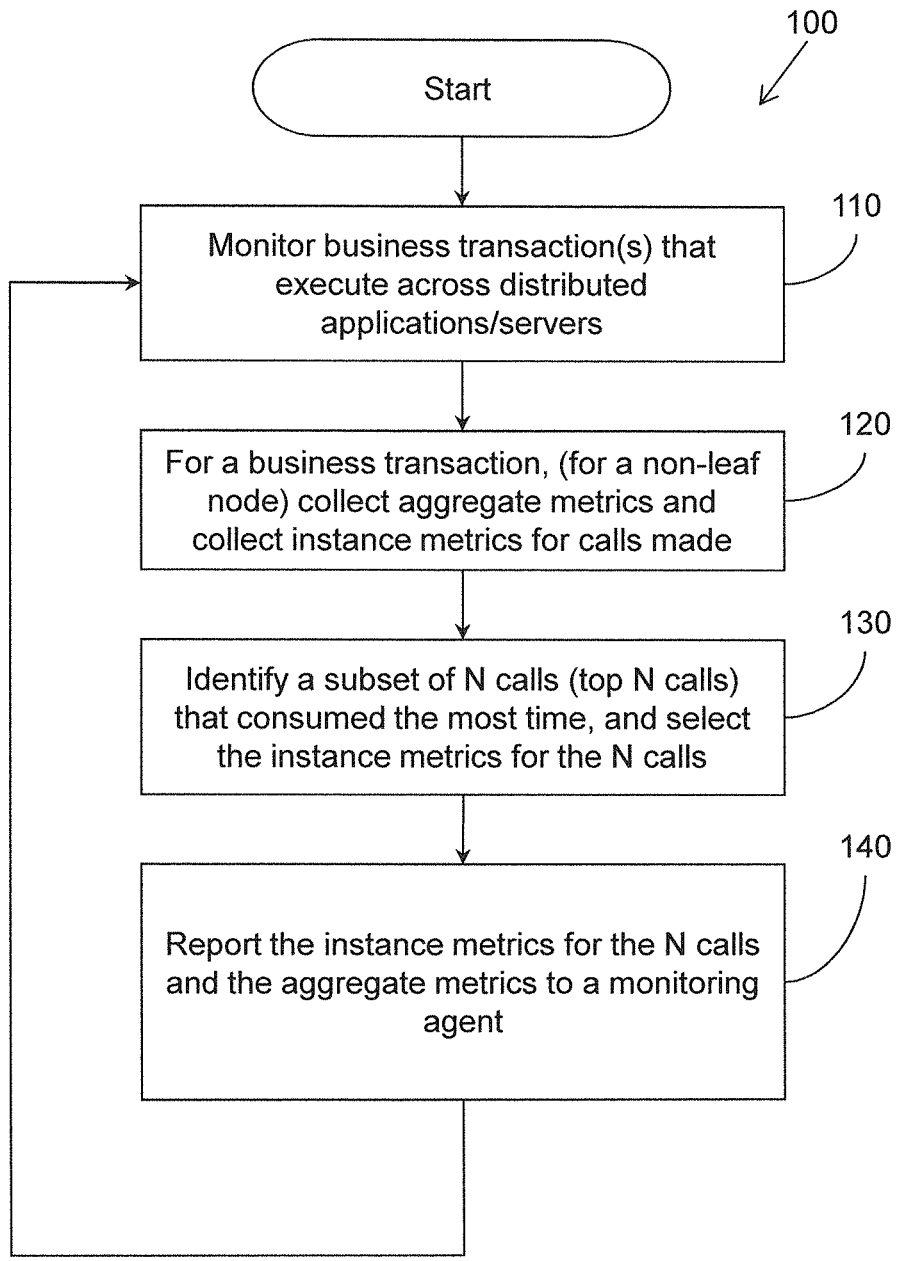
FIG. 1 illustrates one embodiment of a computer-implemented method associated with monitoring a business transaction.

With reference to FIG. 1, one embodiment of a computer-implemented method 100 associated with monitoring business transactions is illustrated. As previously stated, monitoring business transaction performance for large complex distributed applications involves capturing metrics to provide visibility into the business transaction's flow, sequence of calls, and timing information. If the amount of data collected is too little, then the data is not useful or if the amount of data collected is too much, then a prohibitively expensive amount of overhead is incurred.

Method 100 will be described with reference to a monitoring agent. In one embodiment, the monitoring agent is a computer configured with an application configured to monitor another executing application. For example, the monitoring agent may be a business transaction management (BTM) component. BTM is the practice of managing information technology (IT) from a business transaction perspective. It provides a tool for tracking the flow of transactions across IT infrastructure, in addition to detection, alerting, and correction of unexpected changes in business or technical conditions. BTM provides visibility into the flow of transactions across infrastructure tiers, including a dynamic mapping of the application topology. In one embodiment, the monitoring agent is configured to monitor transaction traffic in real-time to apprise the operational behavior of each application component. It may provide a rich snapshot of vital runtime data-such as throughput, availability, response times, and faults, which can be collected across various time intervals, as well as built-in reporting capabilities.

In another embodiment, the monitoring agent is any utility that collects and reports data from transactions that execute from a monitored application. A monitoring agent may include a piece of code that is separate from the monitored application but can be executed under the same process as the monitored application. In one embodiment, the monitored application includes monitoring logic (e.g., executable code that functions as the monitoring agent) that is configured to collect specified data/metrics from the monitored application and report the data to the monitoring server (e.g., via a function call, via a network communication). The monitoring logic may be programmed into various components of the monitored application or injected into the executable code of the application at run-time. For example, the logic may be executable byte-code that is injected at specific points within the executable application to be monitored. By injecting code, the monitored application does not need to be re-compiled. Thus, in one embodiment, the monitored application may include many instances of monitoring logic (many portions of code that function as an agent) that report metrics to a central monitoring server. In one embodiment, the monitoring agent resides and executes within the same server as the monitored application. All monitoring agents are configured to communicate with a central monitoring server that stores, analyzes, and correlates data/metrics received from the multiple agents.

With reference to FIG. 1, at 110, method 100 may initiate at various times during the execution of the monitored application in order to monitor a business transaction that executes across a distributed application and/or distributed servers. The method will be described from the view point of a single business transaction that is being processed but it will be appreciated that many business transactions may be executing simultaneously from the distributed application and different transactions may be monitored separately. As one example, suppose the distributed application is an online shopping application and the business transaction is initiated when a customer initiates a "submit order" action to buy selected items. During the processing of the business transaction (submit order), many function calls may be made to third party computer systems and/or function calls to different components in order to complete the submit order transaction.

At 120, the method collects aggregate metrics from the processing of the business transaction (including aggregate metrics for calls made from one component to another component). In one embodiment, the metrics are collected at calling components (e.g., a non-leaf node in a call-graph). The method also collects instance metrics for calls made from one component to other components of the monitored application during the execution of the business transaction. For example, a component may be a servlet, an application, a routine, a sub-routine, a module, or other hardware/ software component that may make a function call to another component. One call (e.g., from a parent component) may trigger multiple sub-calls (e.g., to children, and sub-children) that together are needed to complete the original function of the first call. Thus in one embodiment, calls may be grouped together hierarchically based on parent-child dependencies. This will be described later with reference to a call-graph in FIG. 3.

In one embodiment, the aggregate metrics that are collected for the business include data that is directed more to the overall performance of a transaction and not specific to a particular instance of a call. For example as stated previously, if component A calls component B 1000 times, one aggregate metric may be collected and reported for the overall 1000 calls (e.g., average response time). Application administrators responsible for the health of their business transactions care most about the overall performance (provided by aggregate metrics) of their business transactions, and occasionally use deeper visibility only when something goes wrong during the business transaction instances so they can triage and diagnose these instances effectively. Collecting aggregate metrics offers the most efficiency in terms of a low level of data collected, but is functionally limited since there are no details on individual instances. Thus if an error occurs or detail analysis is needed to identify a problem, these metrics provide little information to identify problems. Aggregate metrics are used to find an average, maximum, minimum, sum, or number of occurrences of a situation or event. Example aggregate metrics for a component that executes may include an average time spent by the component, number of requests handled by the component, maximum time spent by the component, minimum time required for the component, and/or total time taken for the component. In one embodiment, the monitoring logic as discussed previously (e.g., monitoring agent code injected into the component's code) is configured to collect a specified set of aggregate metrics from a business transaction performed by the component.

In one embodiment, the instance metrics collected at 120 include detailed metrics on each call instance. In one example, instance metrics return a result from each run (or instance) of a process or call. For example, if 10,000 calls are made, then 10,000 instance metrics may be collected (based on selected details desired). In contrast, just one aggregate metric may be collected for the 10,000 calls (e.g., average time, maximum time, minimum time, etc.) Examples of instance metrics for each call may be the name of a function call, identity of the caller and the callee, a working time duration of the call, the name of an assigned user, a supplier's response time, a cost of a step performed during the call, and so on. These types of data may also be collected as part of an aggregate metric but for a group of calls, not individual calls.

The level of data collection in instance metrics offers the most details of the business transaction, but the data volume and performance overhead is very expensive since there may be tens of thousands of calls being performed. Thus a technique of filtering the instance data (as described below) based on a selective/specified number of calls that consume the most time allows the monitoring agent to collect a reasonable volume of data and report the data to the monitoring server.

With continued reference to FIG. 1, at 130, when a group of calls completes processing, aggregate metrics exist for the transactions as well as instance metrics for every call. Rather than keeping all the metrics, a subset of N calls from the group of calls is identified and selected that consumed the most time. In other words, the N slowest or longest processing calls are identified from the group. In one embodiment, N is a specified number of calls from the total number of calls (e.g., N=3) that are to be reported or is a percentage threshold of the number of calls (e.g., N=80%).

For example, if N=80% and there are 10 calls, then instance metrics from the 2 slowest calls are reported if a reporting threshold is triggered (e.g., 80% threshold of 10 leaves 20% for reporting; thus 2 calls are reported, 8 calls discarded). Of course, N may be configured as the reverse percentage such as 20% to determine a number of calls to report. As a specified number example, if there are 10 calls and N=3 (a specified number of calls to report), then the 3 slowest calls out of the 10 calls are reported. The other 7 calls are filtered out and their instance metrics are discarded. In one embodiment, filtering logic/algorithm is configured to perform these filtering/selection functions as part of the monitoring agent.

At 130, the collected instance metrics are filtered so that only a selected amount of instance metrics is kept based on the slowest calls that consumed the most time. Then at 140, the instance metrics from the selected N calls are reported to the monitoring server along with the aggregate metrics. In one embodiment, the metrics are reported by, for example, transmitting a network communication, a network call, or other electronic communication message(s). The instance metrics from the unselected calls are discarded/deleted and thus not reported.

Overall, method 100 provides an efficient combination of aggregate metrics and instance metrics for monitoring and diagnosing business transactions. The volume of collected data is also scalable by modifying the value of N for determining how many of the slowest calls are reported.

Figure 2:
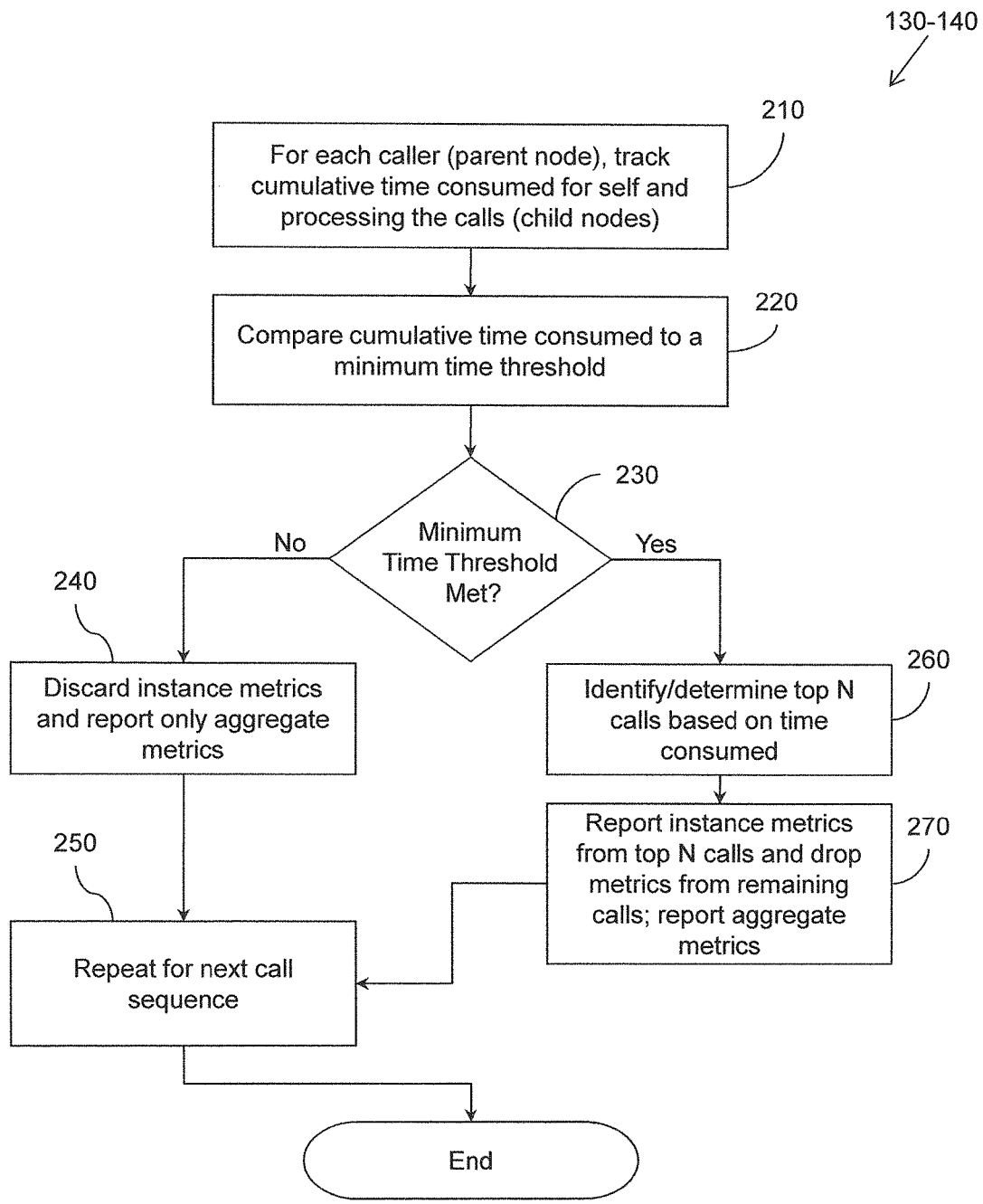
FIG. 2 illustrates another embodiment of portions of the method of FIG. 1.

With reference to FIG. 2, another embodiment of blocks 130-140 from FIG. 1 is shown that operates with a minimum time threshold. At 210, a cumulative time consumed by a caller (for execution of the caller) and its sub-calls is tracked (which form a group of calls). Of course, a function call may include multiple sub-calls made during the business transaction in order to complete the function call. Thus, the time consumed for each sub-call is tracked. As will be seen in the call-graph of FIG. 3, the caller will be represented as a parent node and the callees will be represented as child nodes.

At 220, after the call completes processing, the cumulative time spent by the call (group of calls) is compared to a minimum time threshold. For example, the minimum time threshold may be preset to a default value or may be user specified (e.g., via the monitoring server) based on desired or expected performance levels of the executing distributed application. The minimum time threshold is used to set a minimum/acceptable performance level of the processing calls. This may be regarded as a reporting threshold since if the cumulative time triggers the minimum time threshold, then some of the instance metrics will be reported to a monitoring server.

If, at 230, the minimum time threshold is not met (not exceeded), then it is judged that no problems or significant delays occurred during the processing of the group of calls. In other words, the calls completed processing in a time fast enough that is less than the minimum threshold and the system judges the performance as acceptable. Accordingly, nothing of interest (from an administrator's point of view) has occurred that needs to be analyzed. The method moves to 240.

At 240, in response to the minimum time threshold not being met for the group of calls, the method (i) discards the collected instance metrics from the group of calls (e.g., deletes the data and does not report the data to the monitoring server), and (ii) reports only the collected aggregate metrics to the monitoring server for the business transaction. At 250, the method then continues or repeats for the next call sequence.

If, at 230, the minimum time threshold is met/triggered by the cumulative time of the call, then the method goes to block 260 where the top N calls that consumed the most time are identified and selected. At 270, the instance metrics for the selected N calls are reported along with the aggregate metrics to the monitoring server. In one embodiment, N is a number (e.g., 3) or a percentage (e.g., 80%) used to designate an amount of calls to be selected as the most time consuming calls for which the instance metrics are to be maintained.

For example, suppose that a component made a function call that included ten (10) subsequent sub-calls before the function call was completed. If the minimum time threshold is triggered and N is 3, then the 3 most time consuming calls from the group of calls is determined and the instance metrics for those 3 calls are reported to the monitoring server. Since the minimum time threshold was exceeded, the call is interpreted as taking too much time that may have been caused by "something." Thus having detailed instance metrics may help to identify what caused the delay and at which point. Reporting the instance metrics from the top N slowest calls may be useful information.

As for the other calls in the group, the collected instance metrics from the unselected calls are classified as uninteresting since an error did not occur and nothing of significance happened. These instance metrics are discarded/filtered out since these calls are assumed to not consume a significant amount of time. The instance metrics from these calls are not reported to the monitoring server and thus do not unnecessarily consume resources by maintaining this data.

In one embodiment, at 260, the group of calls made by a component (the caller) is sorted into a list by the time consumed for each call. Then based on the value of N, the top N calls from the list are identified as the calls that consumed the most time. At 270, the collected instance metrics from the top N calls are reported to the monitoring server and the instance metrics from the other calls from the group are dropped/deleted. In another embodiment, the aggregate metrics may be omitted.

In another embodiment, the method may report instance metrics before a call completes processing. For example, sometimes a single call or a group of calls consumes a significant amount of time beyond an acceptable level. A maximum time threshold may be set to indicate the acceptable level and to trigger a timeout alert that causes an early reporting of metrics because it may be beneficial for the monitoring server to receive more timely information when it's happening.

For example, if the maximum time threshold is exceeded for a group of calls prior to all the calls completing their execution, the instance metrics are reported immediately rather than waiting for the calls to complete processing. Thus, in response to a call (e.g., a business-level-transaction call) that triggers the maximum time threshold before completion of the call, the instance metrics for the call (or the top N calls) are reported to the monitoring server prior to completion of the call or the group of calls. In other words, if the system determines that the max time threshold is triggered before completion of the calls made from a parent component, then in response, the instance metrics for the top N calls that consumed the most time are reported to the monitoring server prior to completion of the calls. In one embodiment, the monitoring agent of a calling component may be configured to continuously compare a cumulative time consumed during an execution of a business-transaction-level call from the component, which causes the calls from other components (child components), to a maximum time threshold and in response to the cumulative time triggering the maximum time threshold before completion of the execution of the call, reporting the instance metrics for the call to the monitoring server prior to completion of the execution of the call. This comparison may also be performed by method 100 of FIG. 1, in one embodiment.

In another embodiment, an amount of data collected for the instance metrics from the group of calls may be varied based on the cumulative time spent by the plurality of calls. Thus, the more time the calls consume, the more instance metrics are maintained and reported. For example, the value of N may be increased in order to report more instance metrics as the time spent increases.

Figure 3:
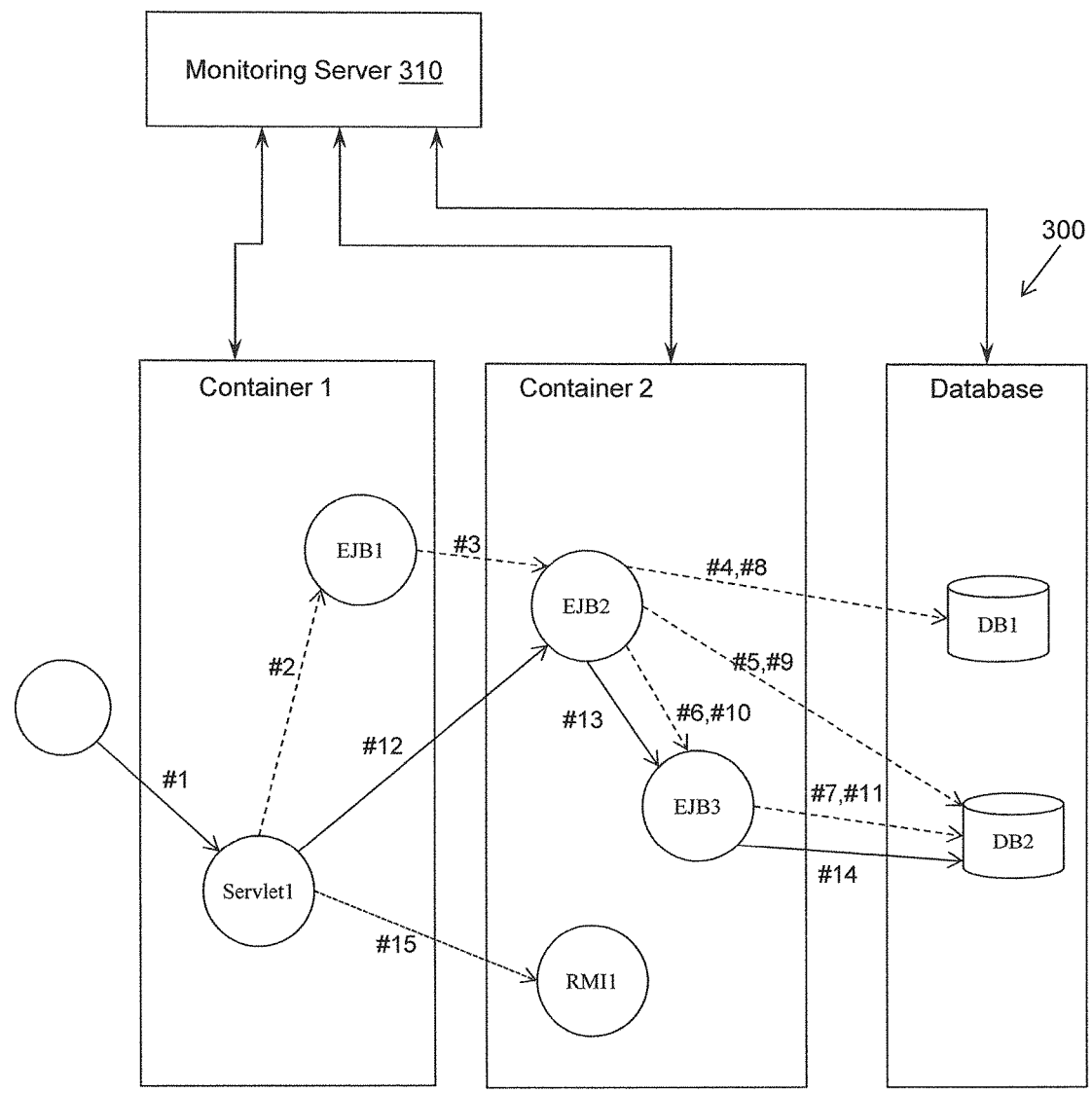
FIG. 3 illustrates one embodiment of a call-graph that illustrates a call-sequence from components that call other components.

With reference to FIG. 3, one embodiment of a call-graph 300 is illustrated. The call-graph 300 is used to provide a visual example of call sequences made during the execution of a business transaction. In one embodiment, the system includes logic/code that monitors when a call is made from a component and collects details of the call. The call-graph 300 is generated with at least nodes for each component that makes a call and a node for the component being called. Call-graph 300 will be used to provide examples for the methods of FIGS. 1 and 2, and to show examples of calls that trigger or do not trigger a time threshold. Nodes in the graph show who calls who. FIG. 4 will also be used to describe details from the sequence of calls in the call-graph 300 of FIG. 3.

For explanatory purposes, the structure of the call-graph 300 is as follows. Each component in a distributed application that calls another component (e.g., via a function call, sub-routine call) is shown as a node in the call-graph 300. For example, if Servlet1 calls Enterprise Java Bean1 (EJB1), these two components are shown as nodes (see Container 1). Likewise, EJB2, EJB3, Database1 (DB1), DB2, and Remote Method Invocation 1 (RMI1) are components shown as nodes in the call-graph 300. A component that initiates a call or is called may be a hardware/software component, a servlet, application, a function, a sub-routine, or other object. A call from one component to another is shown as an arrow line in the call-graph 300.

Arrow lines of the same type represent a group of calls that occur in sequence denoted by the "#." The group of calls creates a parent-child relationship of calls between nodes. For example, the first call #1 of the business transaction is made to Servlet1. Servlet1 is shown with three (3) different out-arrows, which are dashed line #2, solid line #12, and dotted line #15. Each line represents a call made to another node. The type of line represents a sequence of calls that are grouped together. Thus, calls #2 to #11 are related (dashed lines) and calls #12 to #14 are related (solid line).

In one embodiment, a monitoring server 310 is configured to discover and monitor selected components from a monitored application (as previously described). For example, the components may include Java technology components (Servlet, Enterprise Java Bean (EJB), Remote Method Invocation (RMI), Java API for XML-based remote procedure call (JAXRPC), Web Services (WS), Java Database Connectivity (JDBC), JMS, SOA, OSB, etc.) of any Java application, or other type of application. The monitoring server 310 is configured with logic to build a call-graph of executing business transactions by observing/monitoring message exchanges between components (e.g., monitoring communication traffic: messages between Servlet→EJB→JDBC). As stated previously, in one embodiment, the components may include monitoring logic (injected code) that is configured to collect specified data and report the data back to the monitoring server 310 (via a network call, network communication, and so on).

In one embodiment, the monitoring agent (or the injected code) is configured to allow users to define per business transaction performance thresholds such as a maximum time threshold to determine when instance metrics are reported and to determine when to ignore uninteresting instances and call-graph branches.

With continued reference to FIG. 3, in one embodiment, for synchronous business transaction instances, each parent node in the call-graph 300 monitors all calls to its immediate children. When all the children complete their processing and the parent completes its processing (and is ready to return flow to its caller), the monitoring logic of the parent node reports back aggregate metrics on all its immediate children, and reports the top N cumulative canonicalized instance calls for each of its top N immediate children that consumed the most time (slowest children). In one embodiment, canonicalizing the data converts the instance data that has more than one possible representation into a standard, normal, or canonical form.

Looking to the example, the call-graph 300 shows a flow instance across multiple containers and databases. In this example, the top N/X % use default values of N=3 and X %=80%. It is assumed that a unique transaction_name (representing the root node) can reliably be propagated to all children. Further, assume that minimum and maximum time thresholds of root node (Servlet1) has been set to 1000 ms and 5000 ms, respectively (e.g., set by an administrator or by default). Also assume that the min/max thresholds of EJB2 have been set to 500 ms/3000 ms (e.g., by a user). There is no threshold for leaf nodes since they do not make calls. Thus nothing is set for leaf nodes RMI1, DB1, and DB2. An example table of thresholds set for each node is shown in Table 1.

TABLE 1

| Node | Minimum Time Threshold (ms) | Maximum Time Threshold (ms) |
| --- | --- | --- |
| Servlet1 (root) | 1000 | 4000 |
| EJB1 | None | 4000 (inherit from root) |
| EJB2 | 500 (user specified) | 2000 (user specified) |
| EJB3 | None | 4000 (inherit from root) |
| RMI1 | None | no threshold for leaf node |
| DB1 | None | no threshold for leaf node |
| DB2 | None | no threshold for leaf node |

With additional reference to FIG. 4, table 400 shows a call sequence and flow of the call-graph 300 of FIG. 3. The data from table 400 will be used to describe how the system determines when to report instance metrics for particular calls. The columns in table 400 show for each call #, the Root node of the call, the caller (parent node), the callee (child node), a count (number of calls made), a total time consumed by the calls (in milliseconds), a Yes/No indicator whether the instance metrics from the top N calls are reported, and Notes describing how the Yes/No indicator is determined.

In this example, assume the call to each node is synchronous. Servlet1 calls EJB1 (#2), EJB2 (#12), and RMI1 (#15) in sequence.

For the dashed line (----) branch of Servlet1→EJB1 (#2), EJB1 calls EJB2 (#3) twice. From each EJB2 invocation, it calls DB1, DB2, and EJB3 denoted as (#4-#6) and (#8-#10) from the table. In one embodiment, there may be a total of 2 aggregate metrics to be sent from EJB2 but other amounts may be programmed. For EJB2, it calls #4, #5, and #6 in that order. Ten (10) calls are made to DB1 which took 100 ms to complete, to DB2 that took 140 ms, and to EJB3 that took 150 ms (this includes the 100 ms time spent on EJB3→DB2). So the total time of all children for EJB2 (#4-#6) is 390 ms.

Although EJB2 has a user specified min/max threshold, the total time for EJB2 is less than the minimum threshold of 500 ms (shown in Table 1). Thus, only the call summary (aggregate metrics for the group of calls: average response time, min, max, etc.) for EJB2 regarding the group of calls (#4-#6) is reported to the monitoring server 310 without reporting the top N call instance metrics. EJB3 (#7) reports both aggregate metrics and top N call instance metrics because no minimum threshold is set for EJB3 (see Table 1).

After the call to EJB2 (#4-#6), EJB2 is called again by EJB1 because there is a 2 call count for EJB1→EJB2. This time the calls include calls #8, #9, and #10. The call to DB1 (#8) took 400 ms but the observation of DB2 (#9) is forced to stop at 1600 ms because the max threshold (2000 ms) of EJB2 is exceeded.

Exceeding the max time threshold causes EJB2 to report aggregate metrics and the instance metrics from the top N most time consuming calls based only on the already executed calls before the timeout happened. If the first call from a node triggers the max time threshold, then instance metrics from the first call is reported prior to the first call completing execution. The observation and monitoring continues until the calls complete. Suppose the call to DB2 (#9) eventually finishes in 1700 ms and the subsequent EJB3 call (#10) took a total of 200 ms. EJB2 has finished all children calls at this point. Since the time spent by EJB2 has previously raised a timeout alert, an update of the aggregate metrics and the instance metrics from the top N most time consuming calls are reported.

Now, the call from EJB1→EJB2 (#3) is completed. Suppose the total processing time of EJB1 is recorded as 2820 ms. This value is lower than the max threshold inherited from Servlet1 (root) and there is no minimum threshold set. Thus, both the aggregate metrics and the instance metrics from the top N calls are reported to the monitoring server 310.

Continuing with the call-graph 300 in FIG. 3, the flow is now back to Servlet1 and Servlet1 continues by calling EJB2 (call #12), which is the solid line branch. During this call sequence, EJB2 only calls EJB3 (#13) and EJB3 calls DB2 (#14). The total time spent on EJB2 is only 270 ms, which is lower than the minimum threshold of EJB2 (see Table 1 and FIG. 4). Thus the processing of EJB2 is judged as acceptable (e.g., not delayed and no errors). Accordingly, the collected instance metrics from the call are discarded and not reported. Only the aggregate metrics are reported. For EJB3→DB2 (call #14), the logic reports both the collected aggregate metrics and the collected instance metrics from the top N calls because no minimum threshold is set for EJB3 (see Table 1).

After Servlet1 has finished processing the last call #15 to RMI1 (dotted line branch), the total time of all children calls are aggregated. Suppose the total time taken to process call EJB1 (#2) is 2820 ms, EJB2 (#12) is 270 ms, and RMI1 (#15) is 130 ms. The total time taken to call all children from node Servlet1 is 3220 ms. This time value is between the min and max threshold range (1000 ms to 4000 ms) so Servlet1 reports both aggregate metrics and instance metrics from the top N calls based on most time consumed. In one embodiment, the time compared to the threshold is the time that a component spends making calls to other components, and does not include the time spent in the component itself. In another embodiment, this time may be included in the total time.

If however, the total time taken does not trigger the minimum threshold (is below the minimum threshold) (and there were no errors), then the performance is judged as acceptable. In response, the collected instance metrics are dropped/discarded since they are uninteresting and only the aggregate metrics are reported.

In one embodiment, each caller is configured to report back to the monitoring server 310 and identify the N calls that consumed the most time among the calls made by the caller.

In another embodiment, the call-graph 300 may be collapsed, such that multiple nodes can be collapsed into a higher level entity. This type of re-organization further reduces the amount of data to be collected, stored, analyzed and reported. The logic that generates the call-graph may be configured to modify the graph and collapse nodes.

In another embodiment, call instances are correlated by using Java ThreadLocals for business transactions that execute on a single thread. For instances that involve multiple threads or JVMs, correlation algorithms may be used, for example, finger-printing, ECID, or Custom Message Key. Correlation is beyond the scope of this disclosure and will not be further described.

With the disclosed monitoring systems and methods, aggregate metrics are captured for each calling component (node in call-graph) and in addition, the system monitors and captures the top N or X % instance calls for each node in the call graph summarized by the caller. If the cumulative time for the calls made by a node triggers the reporting threshold, the top N instance calls are calculated based on each call's time, which may be canonicalized (normalized/standardized). In another embodiment, a call analysis algorithm (as part of the monitoring system/logic) is configured to merge duplicate calls and reports the calls as a single instance if the instance is within the top N instances based on its time. For example, if in a business transaction, if component A makes 10 almost identical pattern1 calls to component B, and then component A makes 20 almost identical pattern2 calls to component B, the algorithm effectively treats these as two instances (not 30 instances) and reports the counts (number of calls), min, max, average and total response times, for example as:

A→B (pattern1), 10×, 10 ms, 20 ms, 15 ms, 150 ms
A→B (pattern2), 20×, 1 ms, 2 ms, 1.5 ms, 30 ms Further, the disclosed techniques may be tuned to ignore uninteresting business transaction instance metrics (or call-graph branches) below a minimum baseline performance threshold. At the other end of the spectrum, the system may immediately (without waiting indefinitely) report on in-flight instances that exceed a maximum performance threshold, so violations are reported in a timely manner.

By gathering a combination of aggregate metrics and a relevant subset of instance metrics, a comprehensive view of business transaction performance is provided that includes both an aggregate summary view, and detailed instance metrics where useful (where the business transaction performance is slow or has errors). Instance details where the business transaction's performance is satisfactory are ignored. Thus data collection is made more efficient for a computing system. Implementing the time thresholds also provides better scalability to control the amount of instance metrics collected.

In one or more embodiments, various functions may be implemented as summarized as follows. The monitoring agent may be configured to collect summarization of calls per caller (aggregate data). For example, Count (number of calls), min response time, max response time, total response time, and average time of JDBC Calls from a Servlet user interface (UI) Page to a Database. Top N or X % instance call details per caller are grouped by call for each business transaction. For example, top N JDBC SQL calls from a Servlet UI Page to a Database, grouped by canonicalized SQL. The top N calls may be determined as follows:

a. Sort calls in % of descending time consumed b. Calculate the top N' calls that add up to at least X %. i.e. N'=f(X %) where N' is the number of calls that satisfy the threshold value of being at least X % of all the calls based on their response times.

c. Report instance metrics to server for the lower of N or N' calls.

Unique Errored instances are always captured and reported.

In one embodiment, the algorithm is Top N/X %, i.e. report the lower number of calls, N or X %. In the following example, consider a default value for N=3 (report 3 longest calls), and X %=80% (these are configurable by an administrator).

N' is the number of calls that add up to at least X %. For example, consider the following calls from component A to other components B, C, and D:

A→B consumed 50% of the time

A→C consumed 45% of the time

A→D consumed 5% of the time

In this case, the first 2 calls add up to 95% (which is at least 80%; greater than the threshold), so N'=2. The algorithm is designed to find and report the calls where "most of the time was spent", and to ignore other data from other calls. So in this case, instance data for just the first 2 calls (instead of the default N=3 calls) would be reported to the Server when using the condition of "report the lower number of calls N or X % (N')." Call #3 did not take much time, so it is judged as less interesting and is not reported.

Another way to look at it is that N is used to further restrict how many instances the system reports. For example, if component A called 100 immediate children and each call took 1% of the total time, N' would be 80, which some Customers may consider to be a lot of instance data. So, the N=3 condition, would reduce the amount of data reported by restricting it to just 3 calls (instead of 80 calls). Other Customers may prefer to have the instance metrics from all 80 calls reported, and that can accomplish by setting N to a higher number (e.g. N=100). Thus the lower of N=100 or N'=80 in this example is 80.

In another embodiment, a configurable minimum threshold for each business transaction may be provided. The system may ignore instance details when the root node completes successfully within the specified minimum threshold (or by comparing against a baseline). This decision is made locally by the root node for itself (and its direct children). Other downstream children that do not have a specific minimum threshold set for themselves send their data to a central server. The central server is configured to make the decision as to whether to ignore or report the metrics on behalf of the reporting children nodes based on data the server has on the overall performance of the business transaction instance from the root node.

In another embodiment, a configurable maximum threshold for each business transaction may be provided. A configurable timeout value (maximum threshold) for each business transaction may be used so a root node does not wait/hang indefinitely for all its children calls to complete. An administrator can be alerted in a timely manner with the instance metrics upon the time-out. For completeness, the monitoring agent continues to monitor calls even after the time-out, and sends an update after full completion.

In another embodiment, configurable values for Top N/X % and min/max thresholds for each parent node within a business transaction flow may be provided. The values for N/X % and min/max thresholds are configurable at the root (representing the start of the business transaction).

In another embodiment, the monitoring agent/logic is configured to report instance metrics for calls where an error occurred. Reporting the errored calls is not limited by the N calls filtering logic (e.g., errored calls are reported in addition to the N calls reported). For example, in a business transaction instance, if component A makes 10 calls to component B, and 3 of the calls failed due to an error, the monitoring agent algorithm analyzes the 3 errors to identify the unique errors in these calls. The unique error calls with their instance metrics are added to the N reported calls sent to the monitoring server 310. In one embodiment, if the monitoring algorithm identifies that all 3 calls had the same error, the algorithm merges the duplicate error calls and reports only one instance call, with the error details and a 3× count. Since errors may be important for monitoring and diagnostics purposes, the instance metrics for errored calls are reported to the monitoring server 310 and are not restricted by the top N calls filtering logic (e.g., not counted towards the number N calls that are reported).

In other embodiments, in cases where the monitoring agents can reliably inject and propagate a unique transaction_name (that identifies the root node) to all its downstream children in the flow, the monitoring logic supports threshold inheritance by parents in the business transaction flow (e.g., the threshold assigned to a parent node is passed/inherited to its child nodes). Also finer per parent (within the context of the root transaction), values for Top N/X % and max threshold may be passed to child nodes that in turn call other nodes. With the thresholds, each non-root parent (child that calls other components) can independently collect the defined number of instances, and decide to drop call metrics when the calls are below their defined minimum threshold, or timeout calls when they exceed their defined maximum threshold (based on SLA etc.).

In another embodiment, the root transaction_name propagation is performed since a downstream node may be called by multiple different roots with different transaction characteristics. Each downstream parent node needs to know what the relevant settings are within the context of the transaction they are processing. Behind the scenes, each container in the transaction flow periodically polls a central server for configuration about its nodes thresholds (scoped by the unique transaction_name), so the relevant thresholds are known to the relevant nodes before any transactions start executing.

In another embodiment, an option to include the detailed code call-stack in the instance details is provided when the max threshold is exceeded. For example, the call stack could include additional nodes not necessarily captured by the monitoring server (e.g. nodes that do not include the monitoring logic that is injected by bytecode instrumentation). Typically, the call stack is local to a node for which the call stack is captured; whereas the call graph shown in FIG. 3 may include nodes that span several application servers.

In another embodiment, an option to report relevant Throwables/Exceptions for errored business transaction instances is provided. For example, if an error occurs during the business transaction that triggers exception code in the executing application, the exception is reported to the monitoring server.

In another embodiment, if a transaction instance completed successfully below its maximum time threshold, but one or more of the children exceeded their own custom max time threshold, the transaction is flagged by the monitoring logic as a warning. If a transaction instance completed successfully below its minimum time threshold, but one or more of the children exceeded their own custom minimum time threshold, the transaction is flagged as a warning. Instance metrics for the child node may then be reported.

In another embodiment, the monitoring logic is configured to compare business transaction instances, and to highlight differences between the instances to aid in diagnostics and anomaly detection.

In another embodiment, the monitoring logic is configured to identify common bottlenecks and errors for a business transaction by analyzing the metrics across a set of instances.

In another embodiment, the monitoring logic is configured to canonicalize calls to allow grouping of calls. For example, for JDBC by replacing the SQL bind value with "?", and stripping out any SQL comments.

Computer Embodiment

Figure 5:
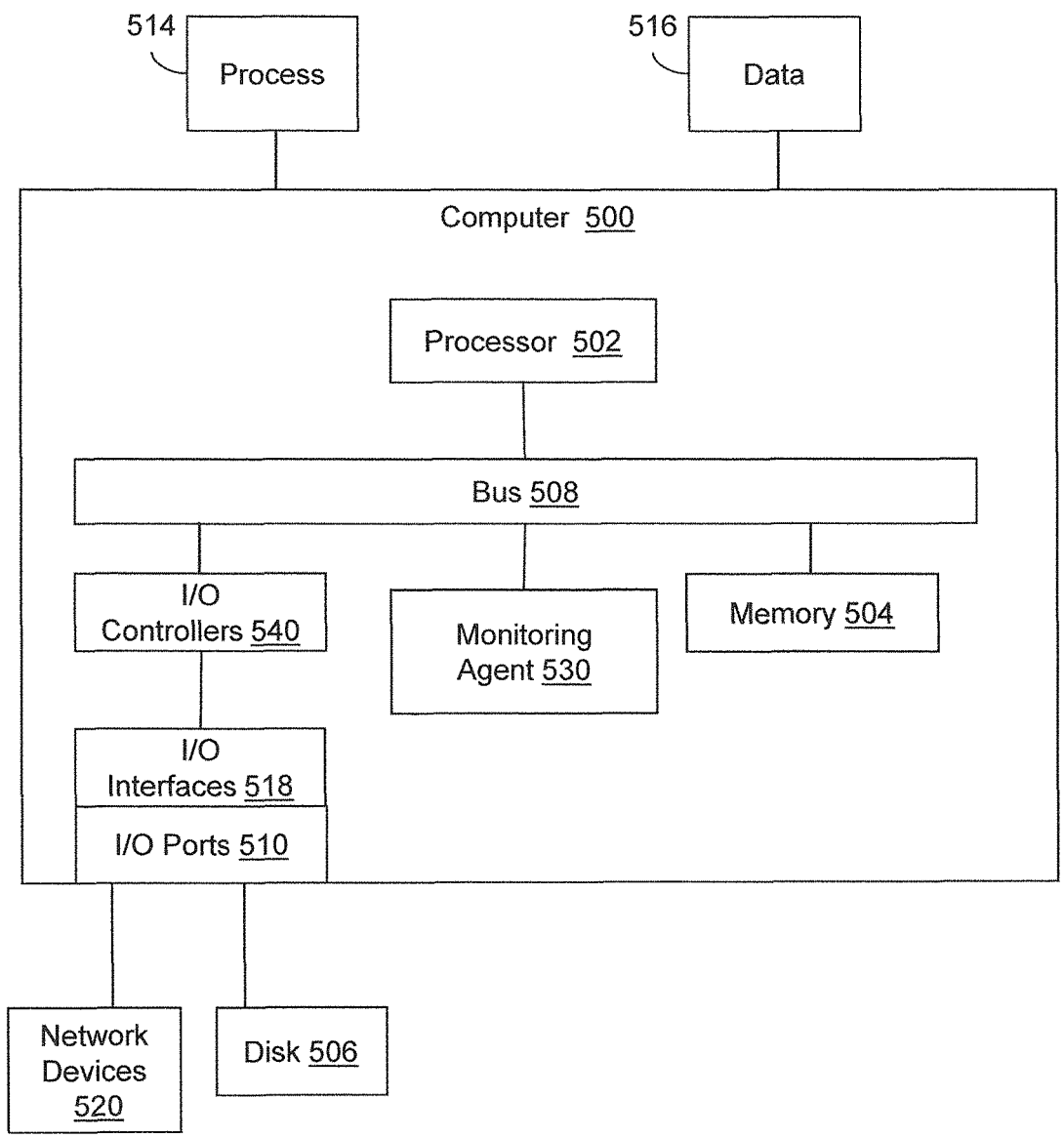
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 may include monitoring logic/agent 530 configured to facilitate the monitoring, metrics collecting, and reporting similar to the methods shown in FIGS. 1 and/or 2. Logic 530 may be the injected code as part of an application being monitored or may the executable monitoring application that makes the computer 500 function as the monitoring server 310 (see FIG. 3) that communicates with the injected code in the monitored application.

In different examples, the logic 530 may be implemented in hardware, a non-transitory computer-readable medium with stored instructions, firmware, and/or combinations thereof that is configured to perform one or more of the functions disclosed herein. While the logic 530 is illustrated as a hardware component attached to the bus 508, it is to be appreciated that in one example, the logic 530 could be implemented in the processor 502.

In one embodiment, logic 530 or the computer is a means (e.g., structure of hardware, non-transitory computer-readable medium, and/or firmware) for performing the methods of FIGS. 1 and/or 2 or any of the functions disclosed herein.

The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with input/output devices via I/O interfaces 518 and the input/output (I/O) ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents are implemented with computer executable instructions. Thus, in one embodiment, a non-transitory computer storage medium is configured with stored computer executable instructions that when executed by a machine (e.g., processor, computer, and so on) cause the machine (and/or associated components) to perform the methods disclosed herein and/or any function/action disclosed herein.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that includes stored executable instructions/application, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. In one embodiment, logic is structure configured to perform the methods disclosed herein and/or any function/action disclosed herein. Logic as described herein is limited to statutory subject matter under 35 U.S.C § 101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-storage medium storing computer-executable instructions that when executed by a computer cause the computer to:
execute a first application that monitors one or more executing transactions that execute across distributed applications;
for a given one of the executing transactions, in response to a given function call of a plurality of function calls for the given one of the executing transactions being executed by a given computer component that executes another function call to another computer component during the executing transaction causing the other computer component to execute a process for the other function call:
collecting aggregate metrics from execution of the given function call and the other function call during the executing transaction;
collecting instance metrics for the plurality of function calls and tracking a cumulative time spent for processing the plurality of function calls;
filtering the instance metrics by (i) identifying a name of each function call of a subset of N function calls from the plurality of function calls that consumed an amount of time meeting a threshold and (ii) selecting the instance metrics for the subset of N function calls;
wherein the filtering discards the instance metrics from unselected function calls that did not consume enough time to meet a threshold in the plurality of function calls; and
aggregating the instance metrics of the subset of N function calls to form a set of aggregate instance metrics for each function in the subset of N function calls, wherein the aggregate instance metric for each function in the subset of N function calls includes data characterizing a number of times that a respective function is called;
controlling transmission of the instance metrics over network communications to a remote monitoring server by transmitting the instance metrics for the selected subset of N function calls according to the filtering.

2. The non-transitory computer-storage medium of claim 1, further comprising instructions configured to determine if a minimum time threshold is set for the plurality function calls for the given transaction, and if set, then determine if the cumulative time spent for processing the plurality of function calls for the given transaction meets the minimum time threshold,
wherein if the minimum time threshold is not met for the plurality of function calls: (i) discard the collected instance metrics from the plurality of function calls, and (ii) report only the collected aggregate metrics to the monitoring server for the executing transaction.

3. The non-transitory computer-storage medium of claim 1, further comprising instructions configured to discard the collected instance metrics for the plurality of function calls for the given transaction without transmitting to the monitoring server when the plurality of function calls completes processing in less time than a minimum time threshold.

4. The non-transitory computer-storage medium of claim 1, further comprising instructions configured to, in response to a processing call for a function call of the plurality of function calls for the given transaction that triggers a maximum time threshold before completion of the processing call, transmit the instance metrics for the processing call to the monitoring server prior to completion of the processing call.

5. The non-transitory computer-storage medium of claim 1, further comprising instructions configured to:
sort the plurality of function calls for the given transaction made by a component by time consumption into a sorted list, wherein the subset of N function calls are identified from the sorted list.

6. The non-transitory computer-storage medium of claim 1, further comprising instructions configured to generate a call graph of executing transactions by observing message exchanges between computer components of the distributed application.

7. The non-transitory computer-storage medium of claim 6, further comprising wherein the call graph includes a hierarchy of nodes where a given node of the hierarchy of nodes represents a caller function of the plurality of function calls for the given transaction and each node branch represents a call to a different component, which is represented as a child node; and wherein each computer component executing a function call during execution of the one given transaction is configured to transmit back to the monitoring server and identify the subset of N function calls that consumed the amount of time meeting the threshold among the function calls.

8. The non-transitory computer-storage medium of claim 1, further comprising instructions configured to vary an amount of data collected for the instance metrics from the plurality of function calls based on the cumulative time spent by the plurality of function calls.

9. A computer-implemented method comprising:

tracking, by at least one processor executing a monitoring application, a given function call of a plurality of function calls made from a first computer component to other computer components in a distributed application wherein the plurality of function calls are part of processing an executing transaction in a computer system;

collecting aggregate metrics for processing the plurality of function calls of the executing transaction;

collecting instance metrics for each of the plurality of function calls of the executing transaction made and a time spent for processing each of the function calls of the executing transaction;

filtering the instance metrics by selecting and identifying a name of each of a subset of N function calls of the plurality of function calls that consumed an amount of time meeting a threshold based on the time spent for processing each function call of the plurality of function calls for the executing transaction;

wherein the filtering discards the instance metrics from unselected function calls of the plurality of function calls for the executing transaction; and aggregating the instance metrics of the subset of N function calls to form a set of aggregate instance metrics for each function in the subset of N function calls, wherein the aggregate instance metric for each function in the subset of N function calls includes data characterizing a number of times that a respective function is called; and controlling transmission of the selected instance metrics over network communications to a remote monitoring server by transmitting the selected instance metrics for the subset of N function calls according to the filtering.

10. The method of claim 9, further comprising:

calculating a cumulative time for processing another subset of function calls of the plurality of function calls for the executing transaction made from the first computer component; and in response to determining that the threshold is not met by the cumulative time for processing the other subset of function calls from the first computer component: (i) the filtering deletes the collected instance metrics from the other subset of function calls, and (ii) transmitting only the collected aggregate metrics for the executing transaction to the remote monitoring server.

11. The method of claim 9, wherein the filtering includes discarding or deleting the collected instance metrics for another subset of function calls of the plurality of function calls for the executing transaction made from the first computer component in response to determining that the other subset of function calls completed processing in less time than a minimum time threshold.

12. The method of claim 9, further comprising continuously comparing a cumulative time consumed during an execution of the executing transaction, which causes another subset of function calls of the plurality of function calls for the executing transaction from the first computer component, to a maximum time threshold and in response to the cumulative time triggering the maximum time threshold before completion of the execution of a given function call of the plurality of the other subset of function calls, transmitting the instance metrics for the function call to the remote monitoring server prior to completion of the execution of the given function call.

13. The method of claim 9, further comprising sorting the plurality of function calls for the executing transaction into a list by time consumed by each function call, wherein the subset of N function calls that consumed the amount of time meeting the threshold are identified from the list.

14. The method of claim 9, further comprising determining that a max time threshold is triggered before completion of the plurality of function calls for the executing transaction made from the first computer component and in response, transmitting the instance metrics for the subset of the N function calls of the plurality of function calls for the executing transaction that consumed the amount of time meeting the threshold to the remote monitoring server prior to completion of the function calls for the executing transaction.

15. A computing system, comprising:

a non-transitory computer-storage medium that stores executable code;

at least one processor configured to execute the executable code; and monitoring logic stored in the non-transitory computer-storage medium that when executed by the at least on processor causes the at least one processor to:

track a plurality of function calls made from one or more computer components to other computer components during the execution of the executable code wherein the plurality of function calls are part of an executing transaction;

collect aggregate metrics for executing the plurality of function calls for the executing transaction;

collect instance metrics for each of the plurality of function calls made and a time spent for processing each of the plurality of function calls;

filter the instance metrics to select and identify a name of each of a subset of N function calls from the plurality of function calls for the executing transaction that consumed an amount of time meeting a time threshold based on the time spent for processing each function call of the plurality of function calls for the executing transaction; and wherein the filtering discards the instance metrics from unselected function calls of the plurality of function calls for the executing transaction; and aggregate the instance metrics of the subset of N function calls to form a set of aggregate instance metrics for each function in the subset of N function calls, wherein the aggregate instance metric for each function in the subset of N function calls includes data characterizing a number of times that a respective function is called; and controlling network transmission of the selected instance metrics over network communications to a remote monitoring server by transmitting the selected instance metrics for the subset of N function calls according to the filtering.

16. The computing system of claim 15, wherein the monitoring logic is further configured to filter and delete the instance metrics collected from unselected function calls from the plurality of function calls for the executing transaction.

17. The computing system of claim 15, wherein the monitoring logic is further configured to determine if a minimum time threshold is set for the plurality of function calls for the executing transaction, and if set, then determine if a cumulative time spent for processing the plurality of function calls for the executing transaction meets the minimum time threshold, wherein if the minimum time threshold is not met for the plurality of function calls for the executing transaction, the monitoring logic is configured to (i) discard the collected instance metrics from all the plurality of function calls for the executing transaction, and (ii) transmit only the collected aggregate metrics to the monitoring server for the executing transaction.

18. The computing system of claim 15, wherein the monitoring logic is further configured to discard the collected instance metrics for the plurality of function calls for the executing transaction without transmitting to the monitoring server, wherein the transmitting occurs in response to determining that the plurality of function calls completes processing in less time than a minimum time threshold.

19. The computing system of claim 15, wherein the monitoring logic is further configured to transmit the instance metrics for a given function call of the plurality of function calls for the executing transaction to the monitoring server prior to completion of the of the given function call in response to the plurality of function calls triggering a maximum time threshold before completion of the plurality of function calls for the executing transaction.

20. The computing system of claim 15, further comprising logic configured to generate a call graph that includes a hierarchy of nodes where each node represents a computer component that executes a function call of the plurality of function calls for the executing transaction and each node branch represents a function call to another computer component, which is represented as a child node; and wherein the logic is configured to collapse selected nodes such that multiple nodes can be collapsed into a higher level entity.

21. The computing system of claim 15, wherein the monitoring logic is configured to transmit instance metrics for function calls of the plurality of function calls for the executing transaction where an error occurred, wherein the errored calls reported are in addition to the selected subset of N function calls transmitted to the monitoring server.

22. The non-transitory computer-storage medium of claim 1, wherein the filtering further comprises keeping another subset of function calls of the plurality of function calls, wherein each function call in the other subset of function calls completes in an amount of time less than a first respective threshold and one or more children of a respective function call in the other subset of function calls consumes more time than a second respective threshold.

\* \* \* \* \*

UNITED STATES PATENT AND TRADEMARK OFFICE
CERTIFICATE OF CORRECTION

PATENT NO. : 10,217,073 B2  
APPLICATION NO. : 14/337874  
DATED : February 26, 2019  
INVENTOR(S) : Kapur et al.

Page 1 of 1

It is certified that error appears in the above-identified patent and that said Letters Patent is hereby corrected as shown below:

In the Specification

In Column 7, Line 28, delete "Servet1" and insert -- Servlet1 --, therefor.

In Column 13, Line 29, delete "FIGS." and insert -- FIG(S). --, therefor.

In Column 13, Line 46, delete "FIGS." and insert -- FIG(S). --, therefor.

In the Claims

In Column 18, Line 46, in Claim 15, delete "on" and insert -- one --, therefor.

In Column 20, Line 7, in Claim 19, delete "of the of the" and insert -- of the --, therefor.

Signed and Sealed this  
Fourth Day of February, 2020

Andrei Iancu  
*Director of the United States Patent and Trademark Office*